United States Patent [19]

Ottinger et al.

[11] Patent Number: 5,322,417
[45] Date of Patent: Jun. 21, 1994

[54] ELECTROMAGNETIC PUMP COOLING BYPASS

[75] Inventors: Brian D. Ottinger, Penn Hills; Richard E. Kothmann, Churchill Boro, both of Pa.

[73] Assignee: Westinghouse Electric Corporation, Pittsburgh, Pa.

[21] Appl. No.: 996,764

[22] Filed: Dec. 23, 1992

[51] Int. Cl.$^5$ ............................................. H02K 44/02
[52] U.S. Cl. ....................................... 417/50; 417/244; 310/11
[58] Field of Search ...................... 417/50, 244; 310/11

[56] References Cited

U.S. PATENT DOCUMENTS

| | | | |
|---|---|---|---|
| 3,980,284 | 9/1976 | Shigihara et al. | 417/50 |
| 4,212,592 | 7/1980 | Olich et al. | 417/50 |
| 4,842,170 | 6/1989 | Del Vecchio et al. | 222/594 |
| 4,928,933 | 5/1990 | Motomura | 417/50 |
| 5,042,969 | 8/1991 | Odd | 417/50 |
| 5,094,803 | 3/1992 | Nishiguchi | 417/50 |
| 5,209,646 | 5/1993 | Smither | 417/50 |

FOREIGN PATENT DOCUMENTS 9004878  5/1990  U.S.S.R. .

Primary Examiner—Richard A. Bertsch
Assistant Examiner—David W. Scheuermann
Attorney, Agent, or Firm—Daniel P. Cillo

[57] ABSTRACT

An electromagnetic pumping assembly (10) for liquid metal is made, which contains an immersible pump section (16) where electromagnetic windings (22) are disposed in the pump section, and an eddy current blocking structure (25) is disposed within the electromagnetic winding (22), providing liquid flow orifices unoccupied by the structure between the eddy current blocking structure and the winding, where there is at least one axial bore (27) through the eddy current blocking structure (25).

7 Claims, 3 Drawing Sheets

ELECTROMAGNETIC PUMP COOLING BYPASS

BACKGROUND OF THE INVENTION

Hundreds of millions of aluminum die-cast parts are made in the United States every year. These parts are produced by many manufacturers on a number of different types of casting machines, but quality and yield of the die-cast parts are concerns common to all manufacturers. For those areas of the market where quality is a primary concern, particularly for suppliers to the automotive industry, new improved die-casting processes need to be improved to the extent that die-cast pieces can replace aluminum forgings.

Molten metal transfer for aluminum die casting and other processes generally includes two operations: transfer of the molten metal from the melting furnace to the holding furnace, and transfer from the holding furnace to the shot chamber of the die-casting machine. Usually, a single large-volume melting furnace is used to supply molten metal to smaller holding furnaces at die casting machines. The transfer to the die casting machine is usually accomplished by manual or mechanized ladling. Some problems associated with transfer ladles are the buildup of dross, and agitation, leading to non-metallic inclusions in the product, and the labor intensive nature of such transfer. Electromagnetic pumps have been used to some extent in transfer to the die-casting machine, but those available have proven to be rather fragile and somewhat costly to maintain.

U.S. Pat. No. 4,212,592 (Olich et al.), teaches a self-priming, low friction, electromagnetic, partial-immersion pump for molten metals. There, a rotating magnetic field, perpendicular to molten aluminum flow, generates currents in the molten metal, and with an inlet swirl inducer causes rotation of the molten metal about the axis of the pump structure, which comprises a high permeability stainless steel cylinder covered with ceramic mat and silicon carbide. The currents produced, interact with the magnetic field and a torpedo inductor to provide a forward propelling force in the molten metal. The swirl inducer of the torpedo comprises a plurality of spaced apart openings along the sides of the torpedo inductor. In this patent an annular ring extends from and circumscribes the solid torpedo inductor body.

In U.S. Pat. No. 4,842,170 (Del Vecchio et al.), monophase electromagnetic field operations are detailed for flow control devices used to control molten metal flow. Here, a variety of torpedo styles are utilized. One torpedo style includes a solid central cylindrical post and a plurality of circumferentially spaced apart vanes extending radially outward from the post. Another style is a cylindrical plug sized to fit closely within a pump nozzle orifice, where the plug has either a plurality of transversely spaced apart bores (12 are shown) extending axially through the plug, or where the plug is an annular ring having a plurality of circumferentially spaced apart interior ribs to define a large "multi-petal shaped" interior space. Similar type torpedo styles are described in U.S. Ser. No. 07/945,456 filed on Sept. 16, 1992 (Slepian et al. W.E. Case No. 57,142). In all of these torpedo styles, no mechanism is provided for reverse flow. The magnetic forces would tend to drive the molten metal in the pumping direction.

The Del Vecchio et al. and Slepian et al. inventions describe how an axial force can be developed in a molten metal column through the interaction of high frequency electromagnetic fields and induced eddy currents. A device generating this force can be used as either a pump or valve. In developing the force, heat is inherently generated within the molten metal stream. In addition to thermal and mechanical stresses that may develop in the pump as a result of the molten metal overheating, the temperature of the metal delivered to the caster may easily exceed the margins permitted.

Die casting machines work on a cyclical basis in which a controlled volume of metal within a cylinder is periodically injected into the mold of the machine by a ram. It would be desirable to hold the metal close to the cylinder between shots for several reasons. Exposure of the molten aluminum to air results in oxidation of the aluminum, forming inclusions in the casting and thereby reducing the quality of the part. If the aluminum is held in a small diameter pipe near the cylinder, contact with the air is minimized. The other reason is one of economics, the closer the metal is to the cylinder, the faster it can be filled. If the aluminum is allowed to drain from the transfer pipe back into the furnace each time, additional cycle time will be required to pump the aluminum from the furnace to the caster.

What is needed is a means to allow use of electromagnetic fields to operate a molten metal pump in a holding application, where a prolonged static head is maintained while avoiding excessive heating of the molten metal in the pump. It is one of the main objects of this invention to provide such a means.

SUMMARY OF THE INVENTION

Accordingly, the invention resides in an electromagnetic pumping assembly for causing a flow of liquid metal, having an entrance end and an exit end and containing electromagnetic windings, characterized in that the assembly contains an immersible pump section near the entrance end, where electromagnetic windings are disposed in the pump section, and an elongated eddy current blocking structure containing circumferentially spaced apart vanes extending radially outward from a central post, where the vanes and post are ceramic, is disposed within the electromagnetic winding providing liquid flow orifices unoccupied by the eddy current blocking structure between the eddy current blocking structure and the winding, where there is at least one axial bore through the central post.

The coils are preferably single phase and can create a standing magnetic wave within each liquid flow orifice, and the bore is effective to allow liquid metal flow through the bore in a direction toward the entrance end of the assembly. The magnetic wave generates a pressure drop or head across the length of the eddy current blocking structure that will drive liquid metal flow through the bore in a direction opposite to the normal flow direction caused by the pump. Preferably, the windings are only a single layer. The electromagnetic windings in the immersible pump section of the pumping assembly can be cooled or uncooled; and are not thick coils of multiple windings of fine wire, or heavy magnetic materials, such as high permeability iron cores, typical of standard motors, are used in the pumping assembly. The pumping action induced by the coils/winding blocking structure result in a pressure drop across the length of the current blocking structure. It is this pressure drop that causes a substantial amount of the reverse flow previously described, toward the entrance end of the assembly.

This invention provides a way to prevent the overheating of metal inside the pump while maintaining a static head (no net flow). This new capability opens new markets and applications where molten metal flow is intermittent and a static head is necessary between flow periods. A specific application of this is in aluminum die casting. This invention can be used for single electromagnetic pump systems or multi-stage electromagnetic pump systems also containing a non-submersible pump section, where both pump sections are connected by a hollow conduit or piping which continues through each pump section. This invention provides a novel means of distributing heat generated in a very localized area. Distributing the heat prevents a large temperature increase within the pump and enhances the heat rejection capability of the piping. This modification does not require additional space or components within the pump, nor does it interfere with the electromagnetic operating principles of the pump.

BRIEF DESCRIPTION OF THE DRAWINGS

In order that the invention can be more clearly understood, convenient embodiments thereof will now be described, by way of example, with reference to the accompanying drawings in which.

DESCRIPTION OF THE PREFERRED EMBODIMENTS

Figure 1:
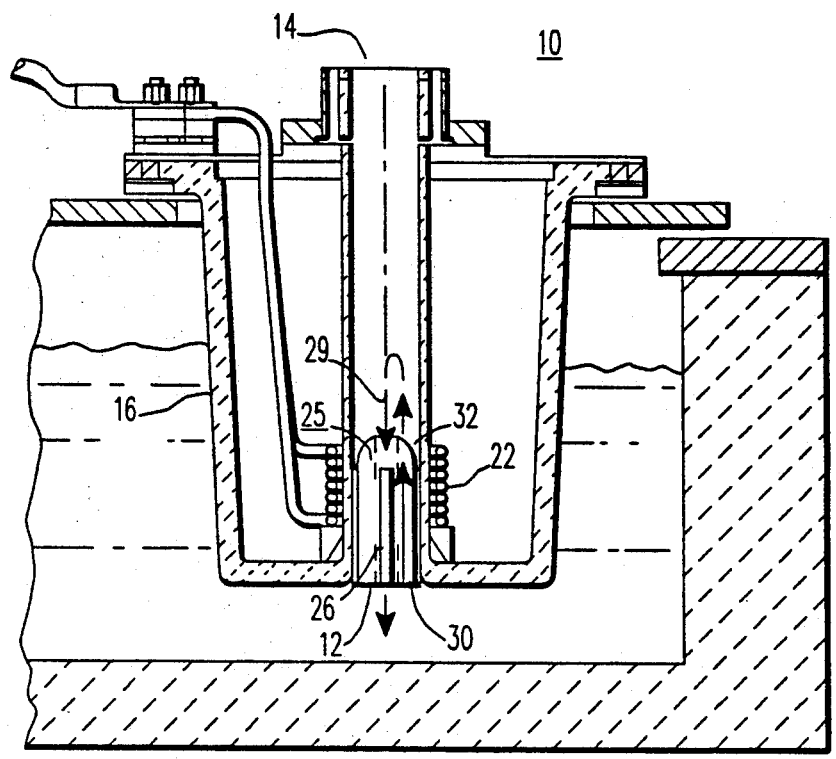
FIG. 1, which best illustrates the invention, shows a cross-sectional view of one embodiment of a single stage, single phase electromagnetic pumping assembly for liquid metal, where a bypass bore according to this invention is used to recirculate molten metal.
Figure 3:
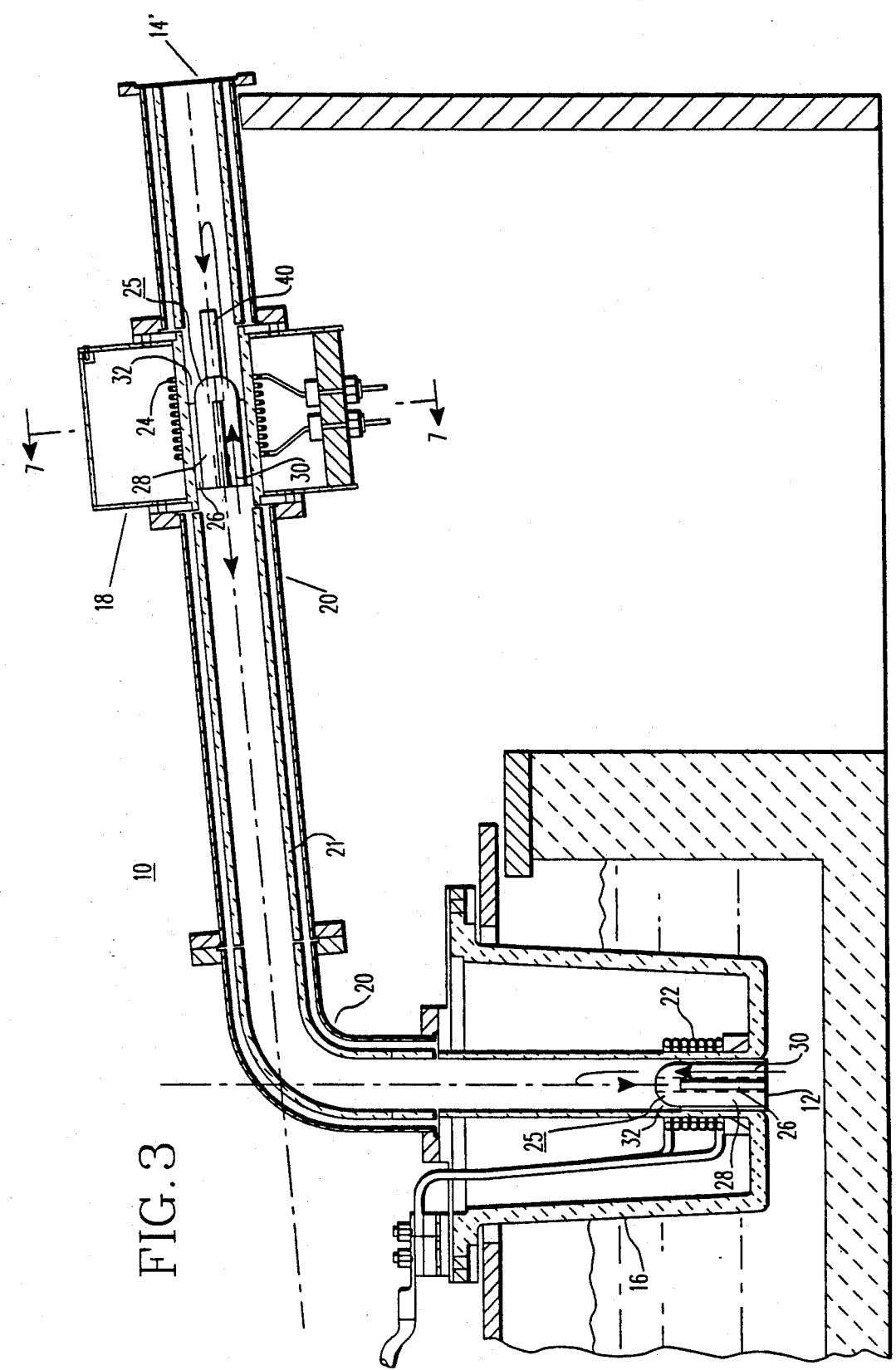
FIG. 3 shows a cross-sectional view of one embodiment of a two stage, single phase electromagnetic pumping assembly for liquid metal, where a torpedo bypass bore according to this invention is used to recirculate molten metal.

Referring now to FIG. 1 of the drawings, a single stage, electromagnetic pump or pumping assembly is shown as 10, for example, a single-phase pump immersed in a molten metal melting furnace, or a holding furnace. The pumping assembly has an entrance end 12 and an exit end 14. There is a submersible pump section 16 near the entrance end 12. FIG. 3 shows a self-priming, two stage, single phase, electromagnetic pump with a non-submersible pump section 18 near the exit end 14'. In FIG. 3, both pump sections 16 and 18 are connected by hollow conduit 20, usually made of steel lined inside with ceramic 21, the ceramic portion of which will usually continue through each pump section 16 and 18. The conduit can be heated, particularly in cases where molten metal is maintained within the conduit for extended periods, as between casts. This heating can be accomplished by using external, insulated radiant heaters or wound external or internal high resistance wires (not shown), to raise the temperature of the outside steel of conduit 20 and also the ceramic liner 21 to the molten metal temperature. In both pumps, submersible pump section 16 has single-phase electromagnetic windings 22, and in the two stage pump, non-submersible pump section 18 has separate, single-phase electromagnetic windings 24.

Figure 2:
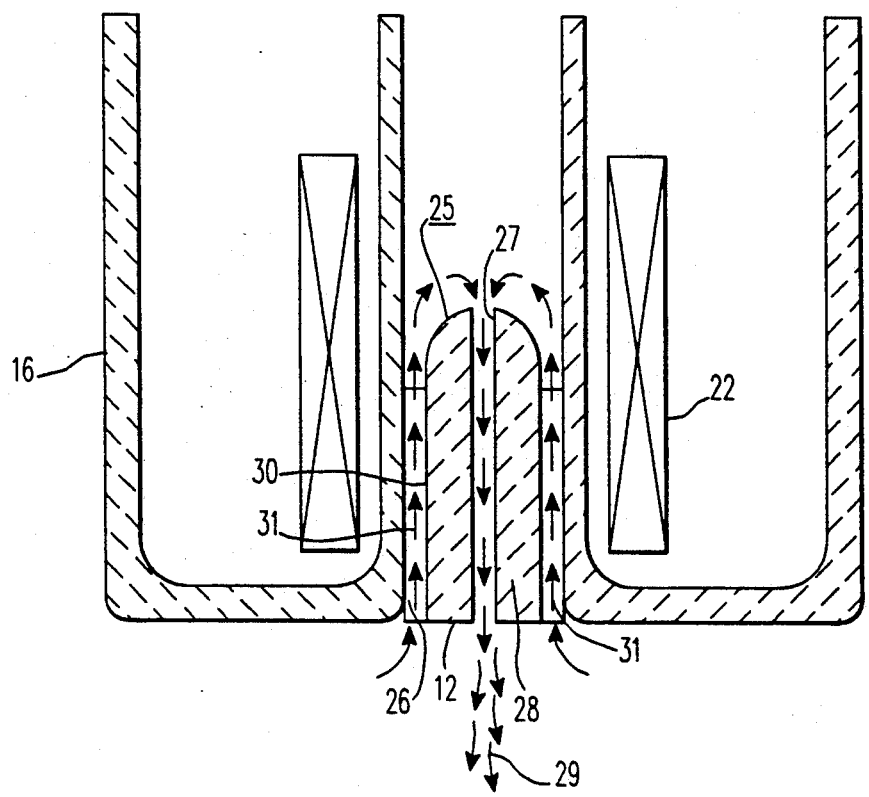
FIG. 2 shows a detailed schematic cross-sectional view of the torpedo, acting as an eddy current blocking structure, disposed within the electromagnetic winding of the pump of FIG. 1, and recirculation of molten metal through its central bore, back towards the entrance end of the assembly.
Figure 4:
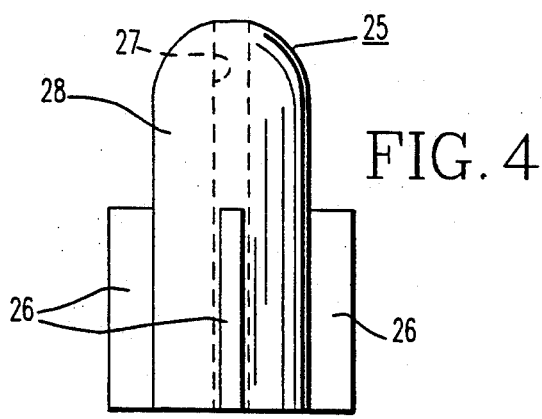
FIG. 4 is an enlarged side elevational view partly in section of one type of solid eddy current blocking structure of the post and fin type which may be disposed in the cross section of each pump section.
Figure 5:
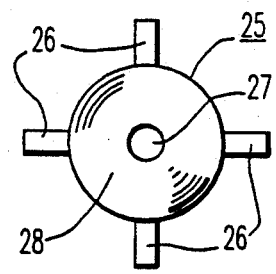
FIG. 5 is a top plan view of the solid structure of FIG. 4.
Figure 6:
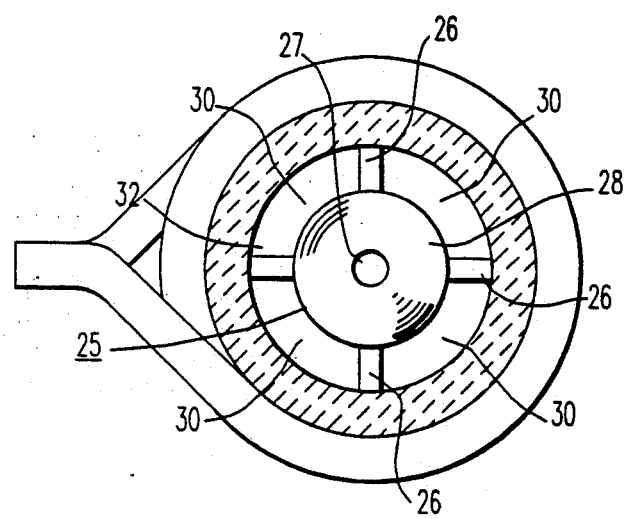
FIG. 6 is a top plan view of the eddy current blocking structure of FIGS. 4 and 5, in place within a conduit, where surrounding wire windings are shown.

In each pump section 16 and 18, an eddy current blocking torpedo structure 25 is placed near the electromagnetic windings 22 or 24 within the hollow, central cross section of that pump section. FIG. 2, shows a detailed cross-section of the eddy current blocking structure 25 disposed within electromagnetic windings 22, where the structure 25 has a bore 27. FIGS. 4 and 5 show one type of eddy current blocking structure 25, comprising circumferentially spaced apart vanes or fins 26 which extend radially outward from a circular central post 28 which has an axial bore 27 therethrough. A plurality of axial bores can be used. As best shown in FIG. 6, this creates liquid flow orifices 30 unoccupied by the structure 25 within each single phase winding 22, or 24, within the conduit at 32 near the single-phase windings 22 and 24, and between the current blocking structure and the windings 22 and 24. The molten metal within the liquid flow orifices 30 is effective during pump operation to shield electromagnetic fields from the bore or bores, so that liquid metal recirculation can occur backward through the bore or bores, opposite normal flow toward the exit of the assembly, driven by the pressure drop across the post.

The blocking structures 25, as well as pump section 6 are non-electrically conducting and usually a high temperature ceramic such as fused silica, silicon carbide, alumina, aluminum titanate, and the like. Pump wall 18 can be ceramic or metal. The inside walls of the bore need not necessarily be parallel. In some cases in a two stage pump, a bore may not be needed in the immersed blocking structure post of the pumping assembly, since it may be sufficient to have a bore in the post located in pump section 18.

Referring now to FIGS. 2 and 6, the electromagnetic windings 22 surround the liquid flow orifices 30 between vanes 26 and can be operated to produce a magnetic field primarily axially directed along forward flow arrow 31, and eddy currents circumferentially directed, transverse to arrow 31, within the flowing liquid metal. The substantially non-electrically conductive eddy current blocking structure vanes 26, and post 28 define eddy current flow regions 30 in the orifices, and eddy current non-flow regions in the post and vanes.

As shown in FIG. 2, this invention provides a backward flow 29 through the bore or bores 27 of the current blocking structure 25, such that even when the pump is operating to provide reduced electromagnetic fields and circumferential eddy currents in order to provide a static head with no net flow, a steady recirculating flow of metal is maintained in and around the structure 25. The backward flow 29 through the post 28, toward the entrance end of the assembly, prevents both local overheating of the metal in the pump and provides a stirring action to enhance heat removal from the pump area.

The invention of Del Vecchio et al., in U.S. Pat. No. 4,842,170, used a solid center refractory torpedo placed in the stream of molten metal to generate the axial force. The torpedo had a solid cylindrical upper section and a finned lower section. An axial body force was developed in the annular region around the torpedo. This force, distributed over the area of the annulus, generated the pressure required to pump the molten metal. If, as in this invention, at least one hole is made through the center of the torpedo, the pressure drop that exists across the length of the torpedo will drive a flow of molten metal through the hole(s) in the hollow torpedo opposite to the normal flow direction of the pump. This flow, shown as 29 in FIG. 2, will emerge from the torpedo as a reverse flow stream. In the holding mode where there is no net flow, a steady recirculation of metal will take place through and around the pump section 16, preventing any local hotspots from forming in the molten metal.

In the holding mode, power is still supplied to the windings but in an amount effective to provide no net flow upstream. In the pumping mode,, power is supplied to the windings in an amount to provide molten metal flow over and above the amount of molten metal recirculating through the bore(s) in the post, and that required to hold the static head.

In a two stage pumping system, such as shown in FIG. 3, the pump that holds the level in the pipe, pump section 18, is located along the length of piping between the furnace and the caster. Heat dissipated into the aluminum by the pump 18 can be rejected to the metal piping 20 by some amount of conduction through the insulation. The metal piping will in turn conduct heat to the surface where it, can be removed through convection and radiation. The reverse stream or jet toward the entrance end of the assembly from the bypass causes a stirring and mixing of the otherwise stationary aluminum upstream from the pump. This brings the heat from the pump into contact with a much larger surface area of pipe.

It is possible that the upstream section of pipe may not be able to handle all of the heat generated by the pump. This might result from poor thermal conductivity through the pipe wall to ambient. Also, the reverse steam or jet may diffuse so rapidly in the upstream fluid that the effective length of piping available for cooling is reduced. In either case, another embodiment of the torpedo-design would increase the area for heat rejection by adding a length of small diameter tubing 40 to the post, effectively increasing the length of the passage from inlet to outlet, as shown in FIG. 3. Separating the inlet and outlet of the post causes the recirculation flow path to be longer, independent of the extent of the reverse jet. This small tube 40 could extend in either or both directions from the post. The extension would have no effect on the pump operation.

In the single stage pump shown in FIGS. 1 and 2 the current blocking structure 25 is located at the bottom of the pump section 16 as part of a large refractory shell. This shell is immersed in metal in a furnace. During pumping, metal, such as molten aluminum flows around the torpedo, and exits the pump at the top, while a small portion of molten metal is also recirculated. During pumping or holding, the recirculating stream 29 emerges from the torpedo as a reverse steam or jet directly into the bulk volume of aluminum in the furnace. Mixing of the hotter aluminum with the cooler bulk aluminum will dissipate the energy from the pump very effectively so that there is no need to dissipate heat to metal piping. Holding furnaces already use heaters to maintain the temperature of the aluminum. Rejecting the heat from the pump into the furnace is a beneficial use of that energy since the internal heaters would not have to supply as much heat. Also, this may eliminate the need for piping modifications to enhance heat transfer.

Regarding eddy current control, the eddy current non-flow regions of the eddy current blocking structure 25, which includes vanes 26 and post 28 are designed so as to substantially block production of circumferential eddy currents in the liquid metal as it would flow through the eddy current blocking structure. This results in a reshaping of the magnetic field near the top of the fins. This provides a radially directed magnetic component which produces a substantially axially directed pumping force in the axial direction of the conduit and which controls the flow of liquid metal therethrough. A detailed description of such magnetic field effects can be found in U.S. Pat. No. 4,842,170 (Del Vecchio et al.), herein incorporated by reference.

Figure 7:
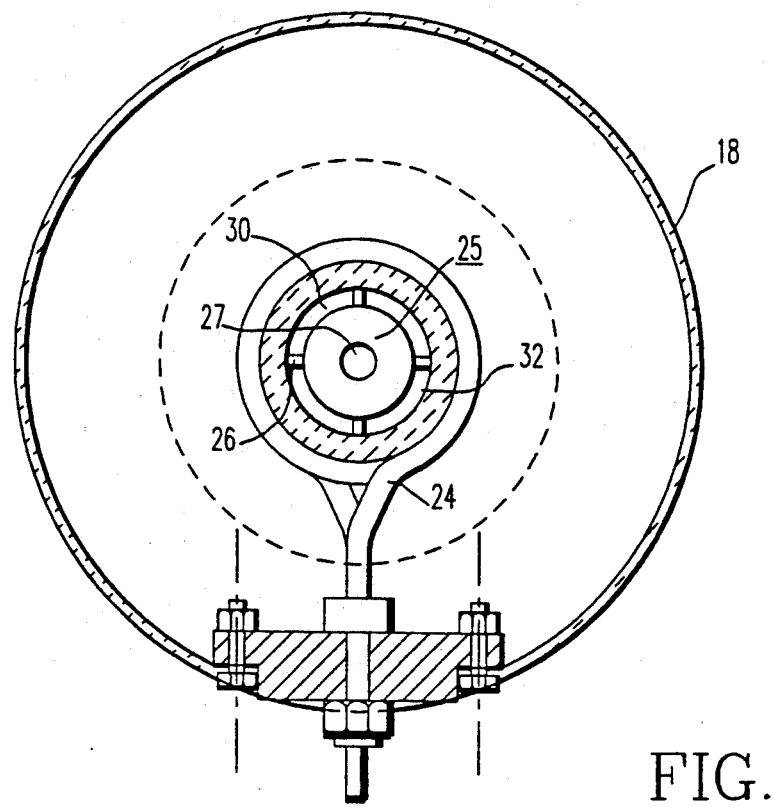
FIG. 7 is a simplified top plan view along line VII—VII of FIG. 3, showing water cooled windings in pump section 18.

One cooling design for the non-submersible pump section 18 is shown in FIG. 7. Liquid such as water or oil, or a gas such as air can be passed through the windings 24 which are hollow and usually made of copper for continuous, efficient, high power, low cost, safe operation. A similar design for the windings 22 for the immersible pump section 16 can be used, or the windings 22 can be solid, uncooled, and made of a high melting point metal, such as molybdenum. A lower melting point material could be used if the required head and duty cycle are both small.

The following example further illustrates the invention and should not be considered limiting in any way.

EXAMPLE

An immersible, single-phase electromagnetic pump somewhat similar to that shown in FIG. 1 of the drawings was constructed as described below.

The immersed pump contained an eddy current blocking structure having a central ceramic torpedo post with a center bore therethrough and surrounding ceramic fins. The pump used was air cooled. The pump was excited by a single-phase ac power supply operating at a nominal frequency of 1400 Hz and operated efficiently to pump and "hold" molten aluminum metal.

Immersed Pump

The immersed pump featured a ten turn solenoidal coil wound of a hollow copper conductor of cross-section 0.635 cm (0.25 inch) by 1.27 cm (0.5 inch). It was wound such that the narrow edge of the conductor formed the inner diameter (ID) of the coil. The ID of the coil was 6.66 cm (2.625 inch). The coil was approximately 8.89 cm (3.5 inches) high. Air was pumped through the hollow conductor as a cooling medium.

The coil sat within a ceramic chamber constructed of fused silica. The chamber was cylindrically shaped, having a 21.59 cm (8.5 inch) ID and a 1.27 cm (0.5 inch) wall, with a flat the bottom and an annular mounting flange at the top. There was a hole in the flat bottom from which a 0.58 cm (0.23 inch) thin-walled pipe extended. The thin-walled pipe ran the length of the outer cylinder and protruded through the center of the solenoidal coil. The coil and pipe were concentric with a gap between the pipe OD and the coil ID.

Located within the pipe and coil was a post-fin shaped insert as shown in FIG. 2. The insert was also constructed of fused silica. The gap between the torpedo post (28 in FIG. 2) and the cylinder ID was 0.508 cm (0.2 inch) with the insert fused to the cylinder by four fins, each 0.635 cm (0.25 inch) thick. The torpedo post portion was 10.16 cm (4 inches) high and of 5.08 cm (2 inches) diameter A central bore as shown in FIG. 2, of 0.51 cm (0.2 inch) diameter ran through the torpedo. The outer cylinder, bottom plate, mounting flange, inner pipe, and torpedo-shaped insert may be manufactured as one piece or as separate pieces which are then rigidly joined together. In the present apparatus, the outer cylinder, bottom plate, mounting flange, and inner pipe were cast as one piece, and a separate insert was then attached. The coil sat on a refractory felt pad atop a pedestal on the bottom plate.

Attached to the mounting flange at the top of the ceramic chamber was a stainless steel cover plate. Between the steel plate and the mounting flange was a refractory felt gasket to improve compliance. The coil leads (extensions of the coil conductor) extended through a cut-out of the plate. In a similar manner, the central pipe extended beyond the top of the plate.

The electromagnetic pump was operated at a power level to cause molten aluminum to flow around the torpedo-fin structure within the air cooled electromagnetic coil. At the required power levels, no overheating of the aluminum in the column was observed, therefore, molten metal must have flowed through the post bore in a direction opposite to the normal flow direction of the pump and emerged at the bottom of the torpedo as a jet back into the molten aluminum pool, dissipating heat. This provided a steady recirculation of molten aluminum with no net flow.

We claim:

1. An electromagnetic pumping assembly for causing a flow of liquid metal, having an entrance end and an exit end and containing electromagnetic windings, comprising an immersible pump section near the entrance end, where single phase electromagnetic windings are disposed in the pump section, and an elongated eddy current blocking structure containing circumferentially spaced apart vanes extending radially outward from a circular central post, where the vanes and post are ceramic, is disposed within the single-phase electromagnetic winding providing liquid flow orifices unoccupied by the eddy current blocking structure, between the eddy current blocking structure and the winding, where the single-phase windings can create a standing magnetic wave within each liquid flow orifice, where there is at least one axial bore through the central post, and where the eddy current blocking structure of post and spaced apart vanes substantially block production of eddy currents in liquid metal as it would flow through the pump section, to reshape the magnetic waves and produce an axially directed pumping force and a resulting pressure drop across the length of the eddy current blocking structure that would drive liquid metal flow through the bore in a direction toward the entrance end of the assembly, said bore being effective to allow liquid metal flow through the bore in a direction toward the entrance end of the assembly.

2. The assembly of claim 1, operated by inserting the submersible pump section in molten metal, where the submersible pump windings are below the molten metal surface where the submersible pump section is energized to cause liquid metal to recirculate around and through the eddy current blocking structure to provide no net flow.

3. The assembly of claim 1, where the electromagnetic windings in each pump section are a single layer, and where molten metal within liquid flow orifices between the vanes is effective during operation to shield electromagnetic fields from the bore so that liquid metal recirculation can occur backward through the bore.

4. The assembly of claim 1, where the post has a single central axial bore therethrough, and the eddy current blocking structures are disposed within the hollow, central cross section of the pump section.

5. The assembly of claim 1, where the immersible pump section is cooled.

6. The assembly of claim 1, where the immersible pump section has hollow copper electromagnetic windings where liquid or gas passes through the windings to cool the pump.

7. The assembly of claim 1, where a non-submersible pump section is attached to the submersible pump section by a hollow conduit, providing a multi-stage pumping assembly, where the non-submersible pump section also contains an elongated eddy current blocking structure disposed within the electromagnetic winding, providing liquid flow orifices unoccupied by the eddy current blocking structure, between the eddy current blocking structure and the winding.

* * * * *